United States Patent
Lin

(10) Patent No.: US 7,128,173 B2
(45) Date of Patent: Oct. 31, 2006

(54) PCD FACE SEAL FOR EARTH-BORING BIT

(75) Inventor: Chih C. Lin, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 174 days.

(21) Appl. No.: 10/768,620

(22) Filed: Jan. 30, 2004

(65) Prior Publication Data

US 2004/0238226 A1 Dec. 2, 2004

Related U.S. Application Data

(63) Continuation-in-part of application No. 09/982,899, filed on Nov. 18, 2001, now Pat. No. 6,684,966.

(51) Int. Cl.
*E21B 10/22* (2006.01)

(52) U.S. Cl. .................................... 175/371

(58) Field of Classification Search .............. 175/371, 175/434, 343, 45; 428/564; 419/18, 54
See application file for complete search history.

(56) References Cited

U.S. PATENT DOCUMENTS

| | | | |
|---|---|---|---|
| 4,224,380 A * | 9/1980 | Bovenkerk et al. | ......... 428/564 |
| 4,255,165 A | 3/1981 | Dennis et al. | |
| 4,398,952 A | 8/1983 | Drake | |
| 4,516,641 A | 5/1985 | Burr | |
| 4,765,950 A * | 8/1988 | Johnson | ....................... 419/54 |
| 4,793,828 A | 12/1988 | Burnand | |
| 5,049,164 A | 9/1991 | Horton et al. | |
| 5,108,813 A | 4/1992 | Noda et al. | |
| 5,176,720 A | 1/1993 | Martell et al. | |
| 5,304,342 A | 4/1994 | Hall, Jr. et al. | |
| 5,351,772 A | 10/1994 | Smith | |
| 5,472,058 A * | 12/1995 | Hooper et al. | .............. 175/371 |
| 5,603,385 A * | 2/1997 | Colebrook | .................... 175/45 |
| 6,026,917 A | 2/2000 | Zahradnik et al. | |
| 6,068,070 A * | 5/2000 | Scott | .......................... 175/434 |
| 6,200,524 B1 * | 3/2001 | Griskin et al. | ................. 419/18 |

FOREIGN PATENT DOCUMENTS

| | | |
|---|---|---|
| EP | 0614999 B1 | 9/1994 |
| EP | 0675303 B1 | 7/1998 |
| GB | 2278865 A | 12/1994 |
| GB | 2288617 A | 10/1995 |
| GB | 2332461 A | 6/1999 |

OTHER PUBLICATIONS

Article entitled *Syndite PCD Wear-Resistant Parts*, A. Lammer, 5 pgs, undated.
Article entitled *Friction & Wear Behaviour of Syndite PCD*, K. Steinmetz, et al. 6 pgs, undated.

* cited by examiner

*Primary Examiner*—David Bagnell
*Assistant Examiner*—Matthew J. Smith
(74) *Attorney, Agent, or Firm*—Bracewell & Giuliani LLP

(57) ABSTRACT

An earth-boring bit has a mechanical face seal assembly with PCD faces. The bit has a bearing shaft with a cone rotatably mounted on the bearing shaft. The seal locates between the bearing shaft and the cone for sealing lubricant therein. The seal includes at least one rigid seal ring having a cemented carbide body and an annular PCD face located on it. The mating face may also be of a PCD material. The cemented carbide body contains a binder that migrates into the PCD face while the PCD face is being formed. A binder-free region is leached on the surface of the PCD face.

15 Claims, 3 Drawing Sheets

PCD FACE SEAL FOR EARTH-BORING BIT

CROSS-REFERENCE TO RELATED APPLICATION

This application is a continuation-in-part of Ser. No. 09/982,899, filed Oct. 18, 2001 now U.S. Pat. No. 6,684,966.

TECHNICAL FIELD

This invention relates in general to earth-boring bits of the roller cutter variety. More particularly, the invention relates to a seal assembly for sealing lubricant within the bit and excluding drilling environment without the bit, the seal assembly having a polycrystalline diamond (PCD) face.

BACKGROUND ART

One of the most successful seal means used in earth-boring bits of the type having rotatable cutters is the O-ring seal disclosed in commonly assigned U.S. Pat. No. 3,397,928, to Galle. The o-ring seal successfully confines lubricant to the bearing area while excluding detritus for long periods of time before failure.

A more recent seal development is the rigid or metal face seal. In the rigid face seal type, the seal interface is between one or two rigid, usually steel, seal rings. One or two elastomer o-rings serve to energize or urge the seal faces of the rigid ring or rings in contact with each other. The rigid face seal has proved to be as successful as the o-ring seal and provides improved durability in high rotational speed applications.

However, because the seal faces of rigid face seals are in constant contact and slide relative to each other, the dominant mode of failure of the seals is wear. Eventually because of the wear, the seal face geometry changes such that the ability of the seal to maintain sealing effectiveness is lost. This leads to eventual seal failure and ultimately results in bit failure. In an effort to minimize seal wear, rigid face seal rings of prior-art seals are constructed of metal alloys such as 440C stainless steel or cobalt base alloys such as Stellite. Use of these materials for the rigid face seals has resulted in significantly increased bit life, but additional improvement in the seal durability is desirable to extend the life in the most severe applications.

Super-hard materials such as natural and synthetic diamond materials have been used on cutting elements for drill bits for some time. It is also known to utilize polycrystalline diamond (PCD) on cutting elements on drill bits of both the fixed cutter and rolling cone type. Also, PCD is used for thrust bearings for downhole drilling motors. The individual PCD disks are spaced in a circular array around the face of a shaft. The PCD diamond material is usually formed in high temperature and high pressure conditions ("HTHP") in which the super-hard material is thermodynamically stable. This technique is conventional and known by those skilled in the art. In the most common process, diamond powder is placed in a refractory vessel. A sintered tungsten carbide disk is placed on the diamond powder. The contents of the vessel are then subjected to high pressure and temperature.

Silicon bonded PCD disks are also available, such as described in U.S. Pat. No. 4,793,828. A silicon bonded PCD disk has a mass of diamond particles present in an amount of 80 to 90 percent by volume and a second phase present in an amount of 10–20 percent by volume. The mass of diamond particles contains substantial diamond-to-diamond bonding to form a coherent, skeletal mass. The second phase consists essentially of silicon, the silicon being in the form of silicon and/or silicon carbide.

SUMMARY OF INVENTION

In this invention, the seal assembly is of a rigid face seal type. In one embodiment, at least one of the rigid seal rings has a polycrystalline diamond layer located thereon. The PCD layer is formed on a carbide substrate as a disk in the HTHP process. This results in a fairly thick diamond face having an average thickness in the range from about 0.5 to 5 mm sintered on a carbide backing. A circular central portion of the disk is then cut out, leaving a part in the shape of a washer. The washer may be subsequently shaped to form at least one of the face seals or bonded by a suitable means to a substrate to form at least one of the face seals.

The carbide body or substrate contains a binder metal, such as cobalt, nickel, or alloys thereof. During the HTHP process, some of the binder metal migrates into the PCD layer. After the HTHP process, the PCD layer is leached to remove binder metal from the surface. The leaching process creates a binder-free region in the PCD face.

BEST MODE FOR CARRYING OUT THE INVENTION

Figure 1:
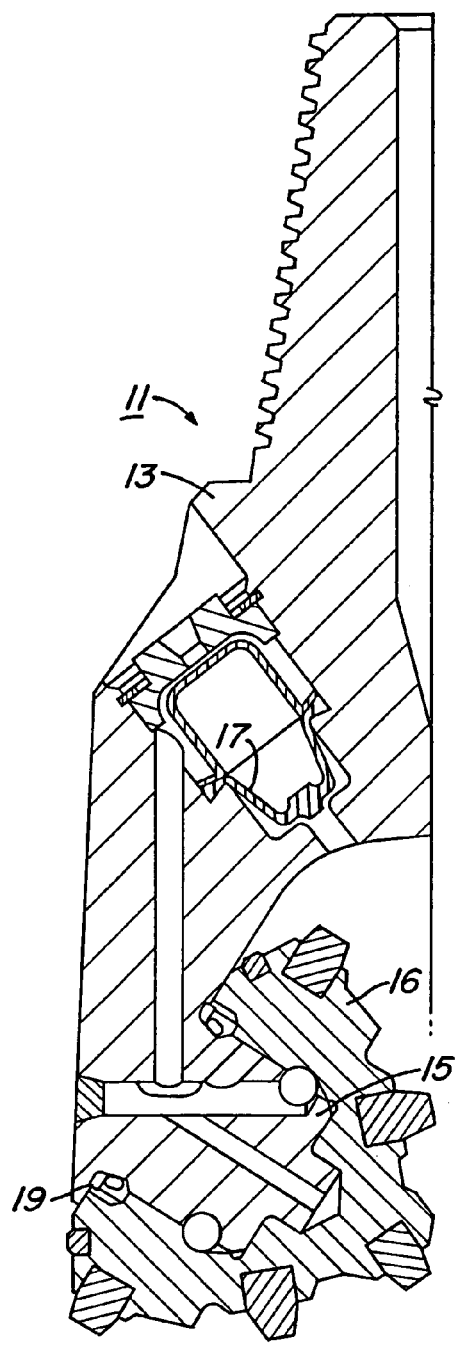
FIG. 1 is a longitudinal sectional view of one leg of an earth-boring bit having a seal assembly in accordance with this invention.

Referring to FIG. 1, bit 11 has a body 13. Body 13 has a leg with a depending bearing pin 15 extending downward and inward. Bit 11 of the embodiment shown will have as many as three bearing pins 15, but only one is shown. A cone 16 is rotatably mounted to each bearing pin 15. Cone 16 has a plurality of external teeth that may be integrally formed with the body of cone 16 or formed of tungsten carbide and pressed into holes, as shown.

Figure 2:
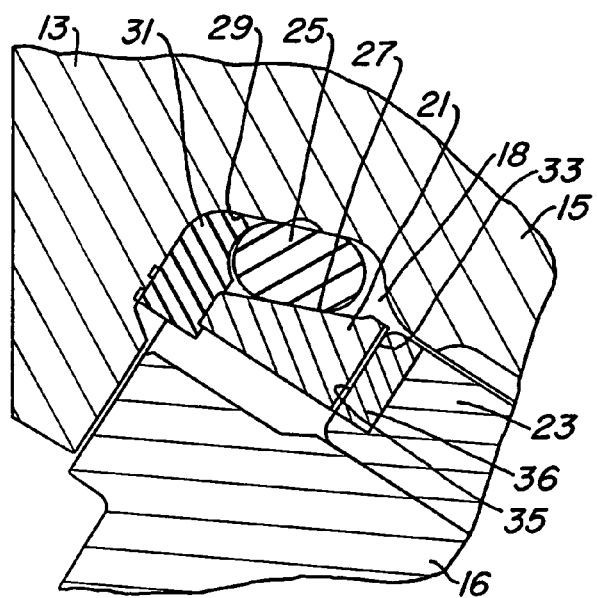
FIG. 2 is an enlarged sectional view of the seal assembly of FIG. 1.

The bearing spaces between bearing pin 15 and cone 16 are filled with a lubricant 18 (FIG. 2). A lubricant compensator 17 equalizes pressure on the exterior of bit 11 with the pressure of lubricant 18 contained in the bearing spaces. A seal assembly 19 located near the base of bearing pin 15 seals lubricant 18 within the bearing spaces.

Referring to FIG. 2, in the preferred embodiment, seal assembly 19 includes a rigid ring 21 surrounding bearing pin 15 near the base of bearing pin 15. Rigid ring 21 is urged into sliding contact with an annular insert 23, which is a ring or sleeve shrunk-fit into the cavity of cone 16. Insert 23 rotates in unison with cone 16, while rigid ring 21 remains stationary with bearing pin 15. An energizing elastomer 25 is deformed between an inner diameter surface 27 of rigid ring 21 and seal cavity 29. Energizing elastomer 25 exerts a force on rigid ring 21 against insert 23. Energizing elastomer 25 also seals lubricant 18 located within the bearing spaces. In this embodiment, an excluder elastomer 31 is also utilized. Excluder elastomer 31 is deformed between a portion of seal cavity 29 in bearing pin 15 and both energizing elastomer 25 and an end of rigid seal ring 21. Excluder elastomer 31 serves to prevent the entry of debris into contact with energizing elastomer 25.

Figure 3:
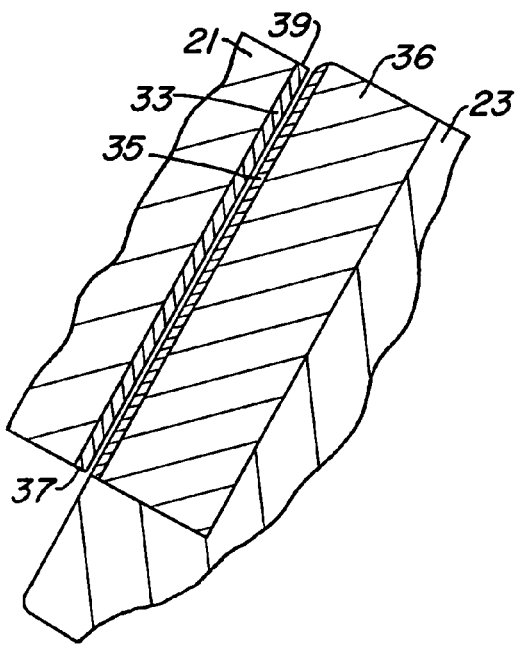
FIG. 3 is a further enlarged view of the mating faces of the seal assembly of FIG. 2, with diamond layers shown exaggerated in thickness.
Figure 4:
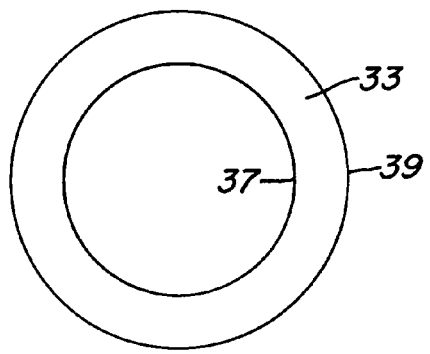
FIG. 4 is a plan view of one of the rigid seal rings of seal assembly of FIG. 2.

Referring to FIG. 3, preferably both rigid ring 21 and insert 23 have a PCD layer or face 33, 35 formed thereon. In the preferred embodiment, the bodies of rigid ring 21 and insert 23 are of a hardened metal, such as steel, selected from the group consisting of iron, cobalt and alloys thereof. Referring to FIG. 4, rigid ring 21 is annular, having an inner diameter 37 that extends around bearing pin 15 (FIG. 1) and an outer diameter 39. Insert 23 also has an inner diameter and an outer diameter and is secured in cone 16 (FIG. 2) by a shrink fit. In this embodiment, faces 33, 35 are smooth and flat and parallel to each other from the inner diameter 37 to the outer diameter 39. Face 35 is bonded to a metal carbide body 36 that is mounted in a recess in insert 23.

In the preferred embodiment PCD faces 33, 35 are formed as circular disks using a metal binder such as cobalt, nickel, or alloys thereof. In this technique, rigid ring 21 and body 36 of insert 23 are formed of carbide, such as tungsten carbide. A conventional HTHP process for forming PCD diamond material is used. A diamond powder is placed within a refractory container of the desired exterior cylindrical shape. A pre-sintered cemented carbide disk 21 or 36, formed of a material such as tungsten carbide, is then placed on the diamond powder within the container. Each carbide disk 21, 36 contains a binder metal of cobalt, nickel, or alloys thereof.

Next, the container is surrounded by pressure transmitting material, which is generally salt, boron nitride, graphite or a similar material. This assembly is then loaded into a high pressure and temperature cell. The cell is compressed until the desired pressure is reached and then heat is supplied, normal via a graphite-tube electric resistance heater. Temperatures in excess of 1350° C. and pressures in excess of 50 kilobars are common. At these conditions, the binder metal of the cemented carbide disk 21 or 36 is molten and acts as a reactive liquid phase to enhance sintering of the diamond material. Some of the binder metal migrates into the diamond material. After a few minutes, the conditions are reduced to room temperature and pressure. The carbide disk 21 or 36 with diamond face 39 or 33 is then broken out of the container. Two carbide disks are required, one for rigid ring 21 and the other for insert 23.

Using a conventional electrical discharge machining (EDM) process, a technician then cuts a circular portion out of the center of one of the disks, through the diamond face 33 and tungsten carbide body, to create the annular configuration of seal ring 21. The technician repeats the process for insert 23. PCD face 35, backed with carbide body 36, may be subsequently brazed or otherwise secured to the remaining portion of insert 23, which is of a hardened metal such as steel. The body of seal ring 21 will preferably be entirely carbide in this embodiment.

Figure 14:
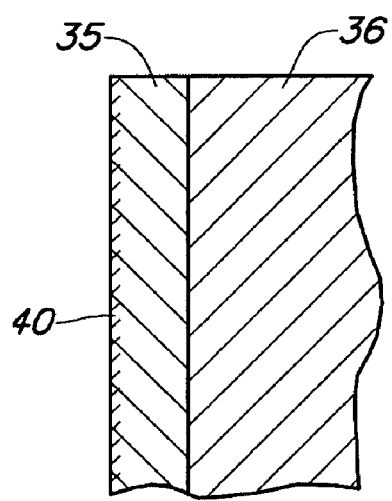
FIG. 14 is a schematic sectional view of another embodiment of a rigid seal ring for the earth boring bit of FIG. 1.

FIG. 14 shows PCD face 35 on carbide body 36. A binder-free layer or region 40 is located on the exterior flat surface of PCD face 35. Cobalt or nickel binder material on the contacting surfaces of PCD faces 35 or 33 can at some operating parameters potentially degrade performance. Thus, binder-free layer 40 is created to remove from the exterior surface of faces 33 and 35 substantially all of the binder material that migrated into that area of PCD faces 33, 35 during the HTHP process. Although shown in FIG. 14 only on face 35, binder-free region 40 is preferably formed on both PCD faces 33, 35.

Binder-free layer 40 is created by placing the exterior surface of PCD face 35 in contact with an acid to leach out the cobalt or nickel binder material that migrated into PCD face 35 from carbide body 36 during the HTHP process. The type of acid and duration of exposure will determine the depth of binder-free layer 40. Preferably, the average thickness or depth of binder-free layer 40 is in a range from about 40–100 microns, while the thickness of PCD face is from about 0.2 to 5 millimeters. The diamond material of PCD face 35 bonds without the need for any binder material, thus the binder-free layer 40 could theoretically extend completely through PCD face 35. However, the cost to form binder-free layer 40 would be much higher, if so. PCD face 35 wears very little during operation, thus binder-free region 40 need be only a small depth relative to the entire thickness of PCD face 35.

In operation, cone 16 rotates about bearing pin 15 while bit body 11 is rotated. Rigid ring 21 will remain stationary with bearing pin 15. Lubricant contained in the bearing spaces is sealed by the dynamic interface between faces 33, 35. Elastomer energizer 25 and excluder elastomer 31 remain stationary with bit body 11.

Figure 5:
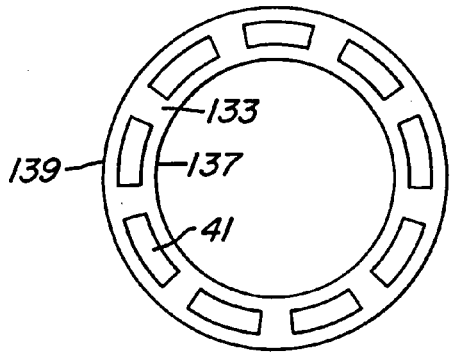
FIG. 5 is a plan view of an alternate embodiment of a rigid seal ring for use with the earth-boring bit of FIG. 1.

FIGS. 5–13 illustrate alternate embodiments of the configuration of diamond face 33. These alternate embodiments could be utilized for either or both of the faces 33, 35. In the embodiment of FIG. 5, generally rectangular shallow pockets 41 are formed circumferentially around face 133. Each recess 41 is spaced circumferentially from other recesses and also spaced inward from outer diameter 139 and outward from inner diameter 137. Recesses 41 serve to retain lubricant.

Figure 6:
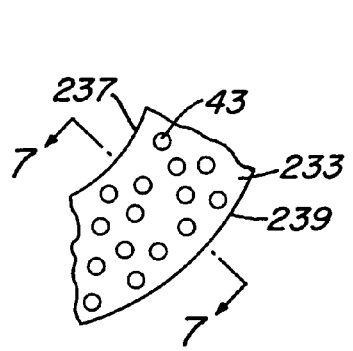
FIG. 6 is a partial plan view of another alternate embodiment of a rigid seal ring for use with the earth-boring bit of FIG. 1.
Figure 7:
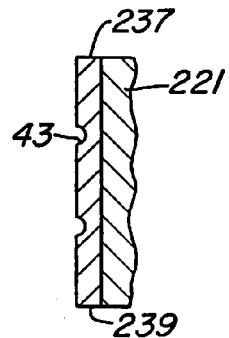
FIG. 7 is a partial plan view of the seal ring of FIG. 6, taken along the line 7—7 of FIG. 6.
Figure 8:
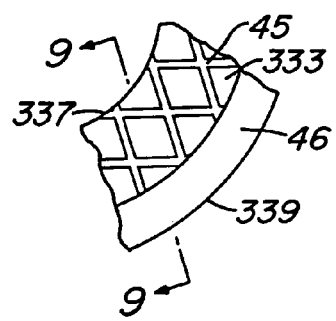
FIG. 8 is a partial plan view of another embodiment of a rigid seal ring for use with the earth-boring bit of FIG. 1.
Figure 9:
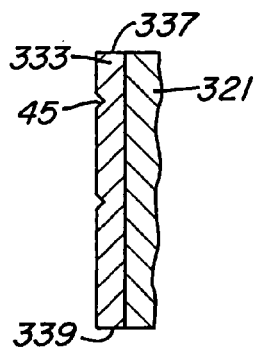
FIG. 9 is a sectional view of the seal ring of FIG. 8, taken along the line 9—9 of FIG. 8.
Figure 10:
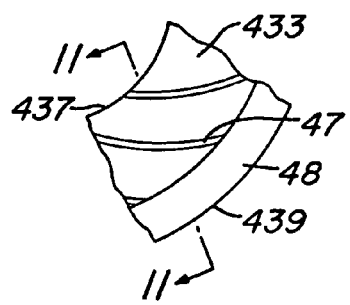
FIG. 10 is a partial plan view of another embodiment of a rigid seal ring for the earth-boring bit of FIG. 1.
Figure 11:
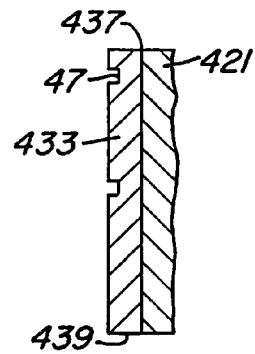
FIG. 11 is a sectional view of the seal ring of FIG. 10, taken along the line 11—11 of FIG. 10.

In FIGS. 6 and 7, recesses 43 are small circular depressions formed in face 233 attached to rigid ring 221. A number of recesses 43 are spaced between inner diameter 237 and outer diameter 239 of face 233. Also, a number of recesses 43 are spaced around the circumference of face 233. In the embodiment of FIGS. 8 and 9, a plurality of grooves 45 are formed in face 333 of rigid ring 321. Each groove 45 extends from the inner diameter 337 to a land 46 of specified width at the perimeter 339 of the seal face. Land 46 is a smooth flat surface that extends to the outer diameter 339. Each groove 45 intersects other grooves 45, forming a diamond cross-hatched pattern. In the embodiment of FIGS. 10 and 11, face 433 of rigid ring 421 has plurality of parallel curved grooves 47. Each groove 47 extends from inner diameter 437 to a land 48 of selected width. Land 48 is a smooth flat surface that extends to the outer diameter 439. Grooves 47 do not intersect each other in the embodiment of FIGS. 10 and 11.

The lubricant pockets, such as shown in FIGS. 5–11, may then be formed by a variety of techniques. One method comprises using a laser to remove portions of the diamond material. Another comprises grinding to remove diamond material, and another comprises using an electrical discharge machine. The depths of the pockets are only a few microns. The chemical leaching process described above to create binder-free region 40 (FIG. 14) is preferably performed after forming the lubricant pockets.

Figure 12:
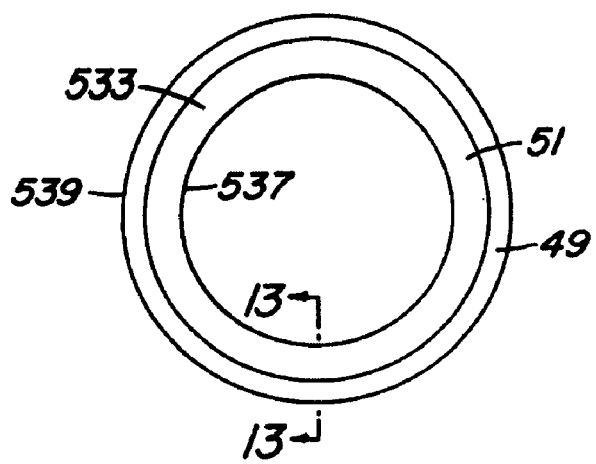
FIG. 12 is a plan view of another embodiment of a rigid seal ring for the earth boring bit of FIG. 1.
Figure 13:
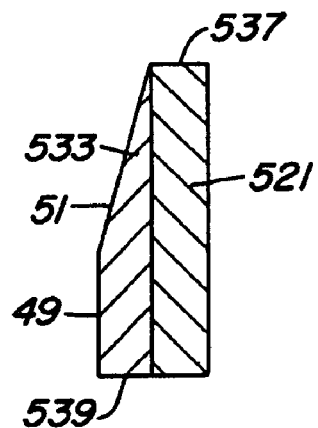
FIG. 13 is a sectional view of the seal ring of FIG. 12, taken along the line 12—12 of FIG. 12.

In the embodiment of FIGS. 12 and 13, seal ring 521 has an inner diameter 537 and an outer diameter 539. A land 49 that is flat, normal to an axis of seal face 533, and parallel to the surface against which it seals extends inward from the outer diameter 539 a specified distance. A conical or tapered lubrication surface 51 of greater width than land 49 extends inward from land 49 to inner diameter 537. Tapered surface 51 is located at an angle relative to land 49 and is not in rotating sealing engagement with a mating surface. The mating surface for seal face 533 will be flat from its inner diameter to its outer diameter, such as illustrated by seal face 35 of FIG. 2. The width of the mating surface may be approximately the same as the width of seal ring 521 from its inner diameter 537 to its outer diameter 539, thus only an outer portion of the mating surface will be in rotating engagement with land 49. Tapered surface 51 is located on the lubricant side of the seal ring 521 when installed to define a space between seal face 533 and the mating surface to feed lubricant to land 49. Land 49 will enlarge in width as it wears in service.

The invention has significant advantages, providing increased wear resistance, lower coefficients of sliding friction and a lower operating temperature over prior art hardened steel faces. Forming the binder-free regions prevents seal performance degradation due to binder material on the surfaces of the PCD layers. These factors combine to provide a longer lasting seal assembly and, thus, a longer lasting bit.

While the invention has been described in only a few of its forms, it should be apparent to those skilled in the art that it is not so limited, but susceptible to various changes without departing from the scope of the invention. For example, although FIG. 2 shows a single rigid seal ring supported by elastomers and engaging a rigid seal ring fixed to the cone, both rigid seal rings could be supported by elastomers.

We claim:

1. An earth-boring bit with an improved mechanical face seal assembly, the earth-boring bit comprising:
    a bit body;
    at least one cantilevered bearing shaft extending inwardly and downwardly from the bit body;
    at least one cone mounted for rotation on the bearing shaft; and
    a seal assembly disposed between the bearing shaft and the cone, the seal assembly including at least one rigid seal ring concentric with the bearing shaft;
    the seal ring having a body of cemented carbide;
    an annular PCD layer located on the body;
    a binder material selected from a group consisting of cobalt, nickel and alloys thereof interspersed within the cemented carbide and within the PCD layer;
    the PCD layer having an exterior surface with an annular binder-free region of a selected depth within the PCD layer that is substantially free of the binder material; and
    wherein the binder-free region has a minimum average depth of 40 microns.

2. An earth-boring bit with an improved mechanical face seal assembly, the earth-boring bit comprising:
    a bit body;
    at least one cantilevered bearing shaft extending inwardly and downwardly from the bit body;
    at least one cone mounted for rotation on the bearing shaft; and
    a seal assembly disposed between the bearing shaft and the cone, the seal assembly including at least one rigid seal ring concentric with the bearing shaft;
    the seal ring having a body of cemented carbide;
    an annular PCD layer located on the body;
    a binder material selected from a group consisting of cobalt, nickel and alloys thereof interspersed within the cemented carbide and within the PCD layer;
    the PCD layer having an exterior surface with an annular binder-free region of a selected depth within the PCD layer that is substantially free of the binder material; and
    wherein the binder-free region has a maximum average depth of 100 microns.

3. The bit according to claim 2, wherein the PCD layer has an average thickness in the range from about 0.2 to 5 millimeters.

4. The bit according to claim 2, wherein the body is formed from tungsten carbide.

5. The bit according to claim 2, wherein the binder-free region is a chemically leached area.

6. An earth-boring bit with an improved mechanical face seal assembly, the earth-boring bit comprising:
    a bit body;
    at least one cantilevered bearing shaft extending inwardly and downwardly from the bit body;
    at least one cone mounted for rotation on the bearing shaft; and
    a seal assembly disposed between the bearing shaft and the cone, the seal assembly including at least one rigid seal ring concentric with the bearing shaft;
    the seal ring having a body of cemented carbide;
    an annular PCD layer located on the body;
    a binder material selected from a group consisting of cobalt, nickel and alloys thereof interspersed within the cemented carbide and within the PCD layer;
    the PCD layer having an exterior surface with an annular binder-free region of a selected depth within the PCD layer that is substantially free of the binder material; and,
    wherein the PCD layer has at least one recess formed therein for enhancing lubrication.

7. The bit according to claim 6, wherein said at least one recess comprises a plurality of recesses circumferentially spaced apart from each other for enhancing lubrication.

8. The bit according to claim 6, wherein the PCD layer has an inner diameter, an outer diameter, and said at least one recess comprises a plurality of recesses circumferentially spaced apart from each other around the ring and radially spaced apart from each other between the inner and outer diameters.

9. The bit according to claim 6, wherein the PCD layer has an inner diameter, an outer diameter, and said at least one recess comprises a plurality of grooves, and a land located adjacent the outer diameter, the grooves extending from the inner diameter and terminating at the land.

10. An earth-boring bit with an improved mechanical face seal assembly, the earth-boring bit comprising:
   a bit body;
   at least one cantilevered bearing shaft extending inwardly and downwardly from the bit body;
   at least one cone mounted for rotation on the bearing shaft;
   lubricant located in bearing spaces between the bearing shaft and the cone; and
   a seal assembly disposed between the bearing shaft and the cone for sealing the lubricant within the bearing spaces, the seal assembly including first and second seal rings, each of the first and second rings having a body having a continuous annular PCD layer located thereon, the PCD layer of each of the rings having an exterior surface that contacts the exterior surface of the other of the seal rings;
   the body of each of the rings being formed of tungsten carbide and a binder selected from a group consisting of cobalt, nickel and alloys thereof;
   a portion of the binder being located in the PCD layer of each of the rings;
   the PCD layer of each of the rings having a leached layer at the exterior surface that is substantially free of the binder and extends to a selected depth within the PCD layer; and
   wherein the PCD layer has an average thickness in the range from about 0.2 to 5 millimeters, and the leached layer has an average thickness less than 100 microns.

11. The bit according to claim 2, wherein the exterior surface of at least one of the PCD layers has a recess formed therein for enhancing lubrication.

12. The bit according to claim 2, wherein the exterior surface of at least one of the PCD layers has a plurality of recesses circumferentially spaced apart from each other for enhancing lubrication.

13. The bit according to claim 2, wherein each of the PCD faces has an inner diameter and an outer diameter, and the exterior surface of at least one of the PCD faces has a plurality of recesses circumferentially spaced apart from each other and radially spaced apart from each other between the inner and outer diameters.

14. The bit according to claim 10, wherein the leached layer has an average thickness of at least 40 microns.

15. A seal ring for an earth-boring bit, comprising:
   an annular body of cemented carbide containing a binder material from a group consisting of cobalt, nickel and alloys thereof;
   a continuous annular PCD layer formed on the body, the PCD layer containing a portion of the binder material that has migrated from the cemented carbide while the PCD layer was being formed;
   the PCD layer having an annular binder-free region that extends to a selected depth within the PCD layer and is leached substantially free of the binder material; and
   wherein the PCD layer has an average thickness in a range from about 0.2 to 5 millimeters, and the binder-free region has an average thickness in a range from about 40 to 100 microns.

* * * * *

UNITED STATES PATENT AND TRADEMARK OFFICE
CERTIFICATE OF CORRECTION

PATENT NO. : 7,128,173 B2  
APPLICATION NO. : 10/768620  
DATED : October 31, 2006  
INVENTOR(S) : Lin et al.

Page 1 of 1

It is certified that error appears in the above-identified patent and that said Letters Patent is hereby corrected as shown below:

Title Page, No. (12):

Under "United States Patent" after "Lin" insert --et al--

Title Page, No. (75):

after "Chih C. Lin, Spring TX (US)" insert:  
--Terry Koltermann, The Woodlands, TX (US)  
Danny E. Scott, Montgomery, TX (US)--

Signed and Sealed this

Seventeenth Day of June, 2008

JON W. DUDAS  
*Director of the United States Patent and Trademark Office*